(12) United States Patent
Zhang (10) Patent No.: US 11,335,742 B2
(45) Date of Patent: May 17, 2022

(54) DISPLAY PANEL AND DISPLAY DEVICE HAVING A CIRCULAR ARCED ENCAPSULATION LAYER

(71) Applicant: WUHAN CHINA STAR OPTOELECTRONICS SEMICONDUCTOR DISPLAY TECHNOLOGY CO., LTD., Hubei (CN)

(72) Inventor: Feng Zhang, Hubei (CN)

(73) Assignee: WUHAN CHINA STAR OPTOELECTRONICS SEMICONDUCTOR DISPLAY TECHNOLOGY CO., LTD., Hubei (CN)

(*) Notice: Subject to any disclaimer, the term of this patent is extended or adjusted under 35 U.S.C. 154(b) by 204 days.

(21) Appl. No.: 16/642,243

(22) PCT Filed: Jan. 10, 2020

(86) PCT No.: PCT/CN2020/071447
§ 371 (c)(1),
(2) Date: Feb. 26, 2020

(87) PCT Pub. No.: WO2021/017423
PCT Pub. Date: Feb. 4, 2021

(65) Prior Publication Data
US 2021/0408172 A1 Dec. 30, 2021

(30) Foreign Application Priority Data
Jul. 31, 2019 (CN) .......................... 201910700979.6

(51) Int. Cl.
*H01L 51/52* (2006.01)
*H01L 27/32* (2006.01)
(Continued)

(52) U.S. Cl.
CPC ...... *H01L 27/3234* (2013.01); *H01L 51/5253* (2013.01); *G02F 1/133528* (2013.01);
(Continued)

(58) Field of Classification Search
CPC ............. H01L 51/5253; H01L 51/5293; H01L 51/5246; H01L 51/5256; H01L 2251/301;
(Continued)

(56) References Cited

U.S. PATENT DOCUMENTS 8,362,697 B2 * 1/2013 Sakaguchi ............. H05B 33/04
313/512
10,177,344 B2 * 1/2019 Wang .................. H01L 51/5268
(Continued)

FOREIGN PATENT DOCUMENTS

CN 103582948 A 2/2014
CN 106847872 A 6/2017
(Continued)

*Primary Examiner* — Ida M Soward (57) ABSTRACT

A display panel and a display device are provided. An encapsulation layer of the display panel includes at least a first organic layer and a first inorganic layer that are stacked. In a corresponding electronic component arrangement area, a cross section of a contact surface of the first organic layer and the first inorganic layer is an arc, so that a part of light blocked by a sub-pixel light-emitting unit can pass through a lighting path of an electronic component to reach a lighting unit after being refracted by the arc, thereby improving light extraction efficiency of the electronic component.

19 Claims, 4 Drawing Sheets

(51) Int. Cl.
  *H01L 27/14* (2006.01)
  *G02F 1/133* (2006.01)
  *G02F 1/1335* (2006.01)
  *G06F 3/041* (2006.01)
  *H01L 27/146* (2006.01)

(52) U.S. Cl.
  CPC ..... *G06F 3/041* (2013.01); *G09G 2300/0408* (2013.01); *H01L 27/14678* (2013.01); *H01L 27/323* (2013.01); *H01L 27/3232* (2013.01); *H01L 51/5246* (2013.01); *H01L 51/5256* (2013.01); *H01L 51/5293* (2013.01); *H01L 2251/301* (2013.01)

(58) Field of Classification Search
  CPC ............... H01L 27/3234; H01L 27/323; H01L 27/3232; H01L 27/14678; G02F 1/133528
  See application file for complete search history.

(56) References Cited

U.S. PATENT DOCUMENTS

| | | | | |
|---|---|---|---|---|
| 10,340,470 B2 * | 7/2019 | Sasaki | ................. | H01L 51/5012 |
| 10,468,611 B2 * | 11/2019 | Seo | ..................... | H01L 51/0097 |
| 10,468,632 B2 * | 11/2019 | Zhai | ..................... | H01L 27/3258 |
| 10,847,752 B2 * | 11/2020 | Wang | ............... | H01L 51/5253 |
| 11,101,407 B2 * | 8/2021 | Oikawa | ............ | H01L 51/5237 |
| 2011/0156578 A1 * | 6/2011 | Jeon | ..................... | H01L 51/5253 |
| | | | | 313/506 |
| 2012/0126268 A1 | 5/2012 | Seo et al. | | |
| 2012/0307123 A1 | 12/2012 | Cok et al. | | |
| 2015/0014636 A1 * | 1/2015 | Kang | .................. | H01L 27/3262 |
| | | | | 438/26 |
| 2016/0254490 A1 * | 9/2016 | Ryu | ..................... | H01L 51/5256 |
| | | | | 257/40 |
| 2016/0322601 A1 * | 11/2016 | Lee | ...................... | H01L 51/5256 |
| 2016/0365523 A1 * | 12/2016 | Nishinohara | ....... | H01L 27/1218 |
| 2017/0352695 A1 | 12/2017 | Tsuchiya | | |
| 2018/0040854 A1 | 2/2018 | Sung et al. | | |
| 2018/0276444 A1 | 9/2018 | Sun et al. | | |
| 2021/0336206 A1 * | 10/2021 | Wang | .................. | H01L 51/5253 |

FOREIGN PATENT DOCUMENTS

| | | |
|---|---|---|
| CN | 107148673 A | 9/2017 |
| CN | 107689423 A | 2/2018 |
| CN | 109472236 A | 3/2019 |
| JP | 2010176928 A | 8/2010 |

* cited by examiner

DISPLAY PANEL AND DISPLAY DEVICE HAVING A CIRCULAR ARCED ENCAPSULATION LAYER

This application claims the priority of Chinese Application No. 201910700979.6 filed on Jul. 31, 2019 and titled "DISPLAY PANEL AND DISPLAY DEVICE", which is incorporated herein by reference in its entirety.

FIELD OF INVENTION

The present disclosure relates to the field of display technologies, and more particularly to a display panel and a display device.

BACKGROUND OF INVENTION

With the widespread development and in-depth application of organic light-emitting diode (OLED) technology, pursuit of high-screen (or even full-screen) displays with better visual experience has become one of current trends in display technology development. For example, under-screen fingerprint recognition technology, under-screen sensing technology, and O-Cut technology have greatly improved a screen ratio of a display. However, under-screen electronic component (camera) technology still faces many constraints such as process or structural design, such as, opacity of each sub-pixel light-emitting unit of an active-matrix organic light-emitting diode (AMOLED) display screen and presence of some films (such as polyimide) with low light transmittance. This will seriously affect collection efficiency of external light by an electronic component under a screen, resulting in inability to obtain ideal imaging performance.

Therefore, conventional display panels have issues that electronic components under screen have low extraction efficiency of external light.

SUMMARY OF INVENTION

The present application provides a display panel and a display device to alleviate that conventional display panels have the technical problems that electronic components under screen have low extraction efficiency of external light.

To solve the above issues, technical solutions provided in the present application are as follows.

An embodiment of the present application provides a display panel, comprising: a base substrate; a driving circuit layer disposed on the base substrate; a light emitting functional layer disposed on the driving circuit layer; and an encapsulation layer disposed on the light emitting functional layer and comprising at least a first organic layer and a first inorganic layer that are stacked, wherein a refractive index of the first organic layer is less than a refractive index of the first inorganic layer; wherein in an electronic component arrangement area, a cross section of a contact surface between the first organic layer and the first inorganic layer is a first circular arc; the first circular arc is located on a lighting path of an electronic component, and a center of the first circular arc is located on one side of the first inorganic layer.

In an embodiment of the present application, a curvature radius of the first circular arc gradually increases from an edge to a middle.

In an embodiment of the present application, the encapsulation layer further comprises a second organic layer and a second inorganic layer that are stacked, and a refractive index of the second organic layer is less than a refractive index of the second inorganic layer.

In an embodiment of the present application, the second organic layer is disposed on the first inorganic layer.

In an embodiment of the present application, the first organic layer is disposed on the second inorganic layer.

In an embodiment of the present application, in the electronic component arrangement area, a cross section of a contact surface between the second organic layer and the second inorganic layer is a second circular arc; the second circular arc is located on the lighting path of the electronic component, and a center of the second circular arc is located on one side of the second inorganic layer.

In an embodiment of the present application, a curvature radius of the second circular arc gradually increases from an edge to a middle.

In an embodiment of the present application, an arc length of the second circular arc is greater than an arc length of the first circular arc.

In an embodiment of the present application, a cross section of a contact surface between the second organic layer and the second inorganic layer is a third circular arc; the third circular arc is located at an edge region of the lighting path of the electronic component, and the center of the third circular arc is located at one side of the second organic layer.

In an embodiment of the present application, a curvature radius of the third circular arc gradually increases from an edge to a middle.

In an embodiment of the present application, an arc length of the third circular arc is greater than an arc length of the first circular arc.

An embodiment of the present application further provides a display device comprising the display panel, comprising: a base substrate; a driving circuit layer disposed on the base substrate; a light emitting functional layer disposed on the driving circuit layer; and an encapsulation layer disposed on the light emitting functional layer and comprising at least a first organic layer and a first inorganic layer that are stacked, wherein a refractive index of the first organic layer is less than a refractive index of the first inorganic layer; wherein in an electronic component arrangement area, a cross section of a contact surface between the first organic layer and the first inorganic layer is a first circular arc; the first circular arc is located on a lighting path of an electronic component, and a center of the first circular arc is located on one side of the first inorganic layer.

In an embodiment of the present application, the display device further comprises a first pressure-sensitive adhesive disposed on the display panel and a polarizer disposed on the first pressure-sensitive adhesive.

In an embodiment of the present application, a cross section of a contact surface between the polarizer and the first pressure-sensitive adhesive is a fourth circular arc; the fourth circular arc is located on the lighting path of the electronic component, and a center of the fourth circular arc is located on the polarizer.

In an embodiment of the present application, a curvature radius of the fourth circular arc gradually increases from an edge to a middle.

In an embodiment of the present application, an arc length of the fourth circular arc is greater than an arc length of the first circular arc.

In an embodiment of the present application, the display device further comprises a touch panel disposed on the polarizer, the touch panel comprises at least a third organic layer and a third inorganic layer that are stacked.

In an embodiment of the present application, a cross section of a contact surface between the third organic layer and the third inorganic layer is a fifth circular arc; the fifth circular arc is located on the lighting path of the electronic component, and a center of the fifth circular arc is located on one side of the third inorganic layer.

In an embodiment of the present application, a curvature radius of the fifth circular arc gradually increases from an edge to a middle.

In an embodiment of the present application, an arc length of the fifth circular arc is greater than an arc length of the first circular arc.

Beneficial effects of the present application are as follows. The present application provides a display panel and a display device. An encapsulation layer of the display panel includes at least a first organic layer and a first inorganic layer that are stacked. In a corresponding electronic component arrangement area, a cross section of a contact surface of the first organic layer and the first inorganic layer is an arc, the arc is located on a lighting path of an electronic component, and a center of the arc is located on one side of the first inorganic layer; a contact surface of a part of film layers is set to be the arc through the electronic component arrangement area, so that a part of light blocked by a sub-pixel light-emitting unit can pass through the lighting path of the electronic component to reach a lighting unit after being refracted by the arc, thereby improving light extraction efficiency of the electronic component.

DESCRIPTION OF DRAWINGS

In order to explain technical solutions in embodiments or the prior art more clearly, the accompanying drawings used in the description of the embodiments or the prior art will be briefly introduced below. Obviously, the drawings in the following description are only some embodiments of the present invention. For those of ordinary skill in the art, other drawings can be obtained according to these drawings without paying creative efforts.

DETAILED DESCRIPTION OF PREFERRED EMBODIMENTS

The following descriptions of embodiments are with reference to the attached drawings to illustrate specific embodiments that can be implemented by the present application. The directional terms mentioned in this application, such as up, down, front, rear, left, right, inside, outside, side, etc., are only directions referring to the attached drawings. Therefore, the directional terms used are used to explain and understand the present application, not to limit the present application. In the figures, similarly structured units are denoted by the same reference numerals.

In view of the technical problem that current electronic components under screen of display panels have low extraction efficiency of external light, embodiments of the present application can alleviate the issue.

Figure 1:
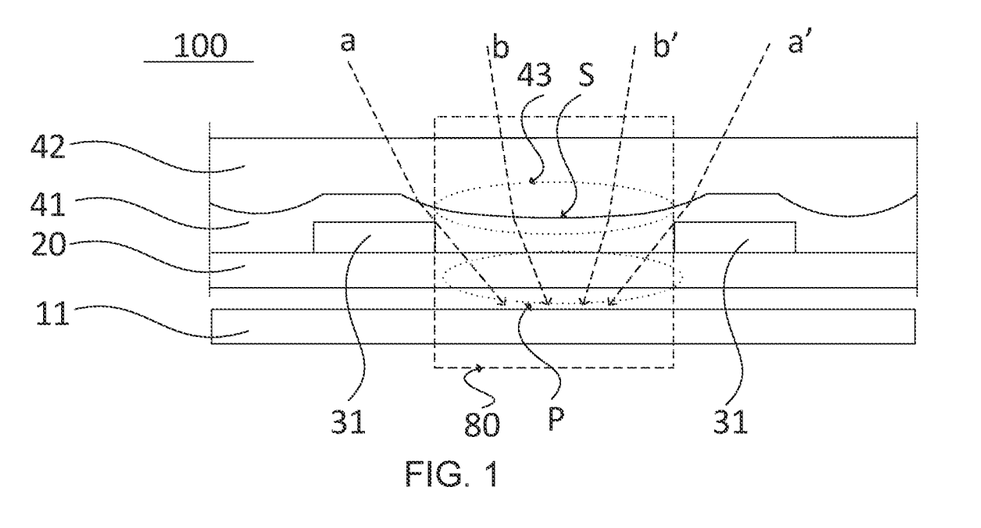
FIG. 1 is a schematic diagram of a first structure of a display panel according to an embodiment of the present application.

In one embodiment, as shown in FIG. 1, a display panel 100 is provided, which includes: a base substrate; a driving circuit layer 20 disposed on the base substrate; a light emitting functional layer disposed on the driving circuit layer 20; and an encapsulation layer disposed on the light emitting functional layer and comprising at least a first organic layer 41 and a first inorganic layer 42 that are stacked, wherein a refractive index of the first organic layer 41 is less than a refractive index of the first inorganic layer 42; wherein in an electronic component arrangement area 80, a cross section of a contact surface 43 between the first organic layer 41 and the first inorganic layer 42 is a first circular arc S; the first circular arc S is located on a lighting path P of an electronic component, and a center of the first circular arc is located on one side of the first inorganic layer 42.

Figure 2:
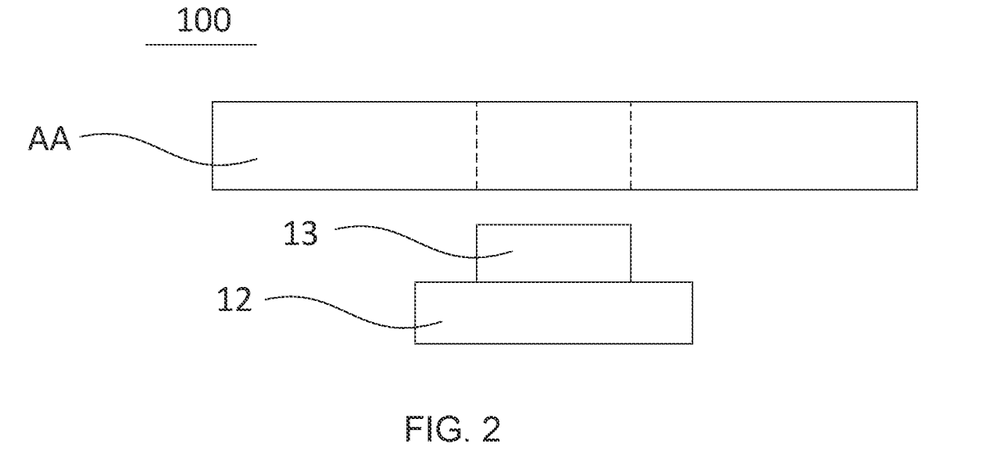
FIG. 2 is a schematic diagram of an electronic component arrangement structure provided by an embodiment of the present application.

In one embodiment, as shown in FIG. 2, an electronic component is disposed in the electronic component arrangement area. According to requirements, the electronic component arrangement area may be located at any position of a display area AA of the display panel. The electronic component includes a lens group 13 that receives external light and a complementary metal oxide semiconductor (CMOS) sensor 12.

In one embodiment, the lens group 13 that receives external light is a lighting unit. Outside light reaches the lighting unit through a set path. This set path is the lighting path. The complementary metal oxide semiconductor sensor 12 is a photosensitive element that converts received external light into electrical energy, and then converts an obtained image signal into a digital signal output through an analog-to-digital converter (ADC) on a chip.

In one embodiment, the light emitting functional layer includes a light emitting material layer. The light emitting material layer includes red (R), green (G), and blue (B) sub-pixel light-emitting units 31 arranged in an array. There is a gap between every two adjacent sub-pixel light-emitting units 31. The gap between adjacent sub-pixel light-emitting units 31 located in the electronic component arrangement area can allow external light to pass through to the lighting unit.

In one embodiment; the red (R), green (G), and blue (B) sub-pixel light-emitting units 31 use an evaporation process to deposit vapor formed by an organic light-emitting material in a light emitting area defined by a pixel definition layer through a mask.

In one embodiment, as shown in FIG. 1, the first organic layer 41 is formed on the light emitting functional layer by any process such as inkjet printing, spray coating, or coating. Then, the first organic layer 41 subjected to the drying process is exposed through a mask. An exposure area is formed in the electronic component arrangement area. Then develop the exposure area to get a desired groove pattern. Then, the groove pattern is etched to form a required first groove.

In one embodiment, a cross-sectional shape of the first groove is a circular arc.

In one embodiment, the first inorganic layer 42 is deposited on the first organic layer 41 by a physical vapor deposition (PVD) or chemical vapor deposition (CVD) or atomic layer deposition (ALD) process. The first inorganic layer 42 is deposited on the first organic layer 41 and filled in the first groove. A cross section forming a contact surface between the first organic layer 41 and the first inorganic layer 42 is a first circular arc.

In an embodiment, as shown in FIG. 1, the first circular arc is located on a gap between two adjacent sub-pixel light-emitting units, that is, on a lighting path of the electronic component. A center of the first circular arc is located on one side of the first inorganic layer 42. A curvature radius of the first circular arc gradually increases from an edge to a middle.

In one embodiment, a refractive index of the first organic layer 41 is less than a refractive index of the first inorganic layer 42.

Figure 3:
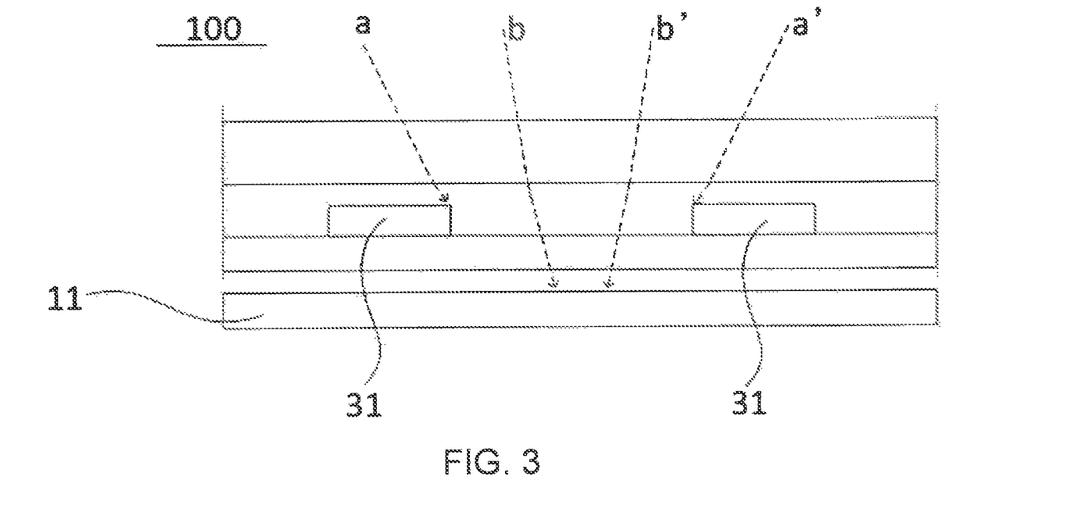
FIG. 3 is a schematic diagram of a first structure of a conventional display panel.

In one embodiment, as shown in the display panel 100 shown in FIG. 3, when the encapsulation layer corresponding to the electronic component arrangement area is not provided with a concave-convex structure, when external light a, a', b, b' strikes the display panel from different angles, part of light a, a' will be blocked by the sub-pixel light-emitting unit 31, and cannot reach the lighting unit 11 of the electronic component through the lighting path, thereby causing low lighting efficiency of the electronic component.

In one embodiment, as shown in FIG. 1, the first circular arc is formed on the encapsulation layer corresponding to the electronic component arrangement area. When external light a, a', b, b' strikes the display panel from different angles, light a, a' originally blocked by adjacent sub-pixel light-emitting units 31 passes through the first circular arc. After refraction, the light a, a' can reach the lighting unit 11 of the electronic component through the gap between the adjacent sub-pixel light-emitting units 31.

This embodiment provides a display panel by providing a first groove on a first organic layer of the encapsulation layer. The first inorganic layer is disposed on the first organic layer and is filled in the first groove. A first circular arc is formed on a contact surface between the first organic layer and the first inorganic layer. After the external light is refracted by the first circular arc, part of the light originally blocked by the sub-pixel light-emitting unit can also pass through the gap between the adjacent sub-pixel light-emitting units and reach the lighting unit of the electronic component. Therefore, the extraction efficiency of the electronic component of the lighting unit for external light is improved.

Figure 4:
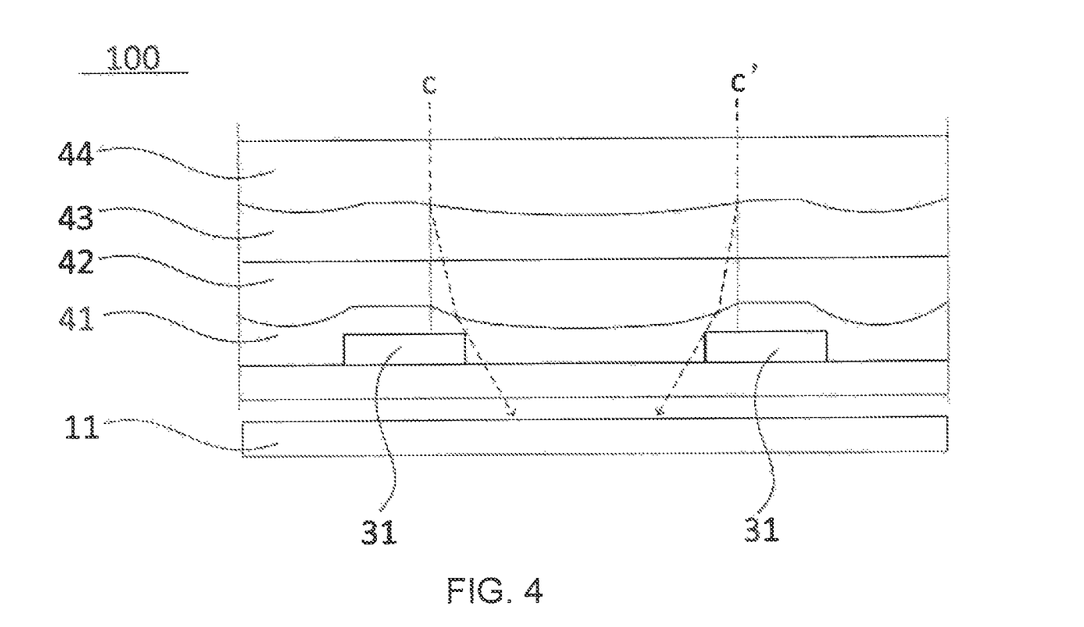
FIG. 4 is a schematic diagram of a second structure of a display panel according to an embodiment of the present application.

In one embodiment, as shown in FIG. 4, the encapsulation layer of the display panel 100 includes, in addition to the first organic layer 41 and the first inorganic layer 42, which are stacked as shown in FIG. 1, and further includes the second organic layer 43 and the second inorganic layer 44 that are stacked. The second organic layer 43 is disposed on the first inorganic layer 42.

In one embodiment, the second organic layer 43 is formed on the first inorganic layer 42 by any process such as inkjet printing, spray coating, or coating. Then, the second organic layer 43 subjected to the drying process is exposed through a mask. An exposure area is formed in the electronic component arrangement area. Then develop the exposure area to get a desired groove pattern. Then, the groove pattern is etched to form a required second groove.

In one embodiment, a cross-sectional shape of the second groove is a circular arc.

In one embodiment, the second inorganic layer 44 is deposited on the second organic layer 43 by a physical vapor deposition (PVD) or chemical vapor deposition (CVD) or atomic layer deposition (ALD) process. The second inorganic layer 44 is deposited on the second organic layer 43 and filled in the second groove. A cross section forming a contact surface between the second organic layer 43 and the second inorganic layer 44 is a second circular arc.

In an embodiment, as shown in FIG. 4, the second circular arc is located on a gap between two adjacent sub-pixel light-emitting units 31, that is, on a lighting path of the electronic component. A center of the second circular arc is located on one side of the second inorganic layer 44. A curvature radius of the second circular arc gradually increases from an edge to a middle.

In one embodiment, a refractive index of the first organic layer 41 is less than a refractive index of the first inorganic layer 42, and a refractive index of the second organic layer 43 is less than a refractive index of the second inorganic layer 44.

In one embodiment, when external light c, c' is incident on the display panel vertically, part of the light c, c' originally blocked by the sub-pixel light-emitting unit 31 is refracted by the first circular arc and the second circular arc twice. The light will pass through the gap of the sub-pixel light-emitting unit 31 and reach the lighting unit 11 of the electronic component.

In the display panel provided in this embodiment, the first circular arc and the second circular arc are provided on the encapsulation layer. In the light incident perpendicularly to the display panel, part of the light blocked by the sub-pixel light-emitting unit is refracted twice by the second circular arc and the first circular arc. The light will pass through the gap between the sub-pixel light-emitting units and reach the lighting unit of the electronic component, thereby improving the extraction efficiency of the external light by the lighting unit of the electronic component.

Figure 5:
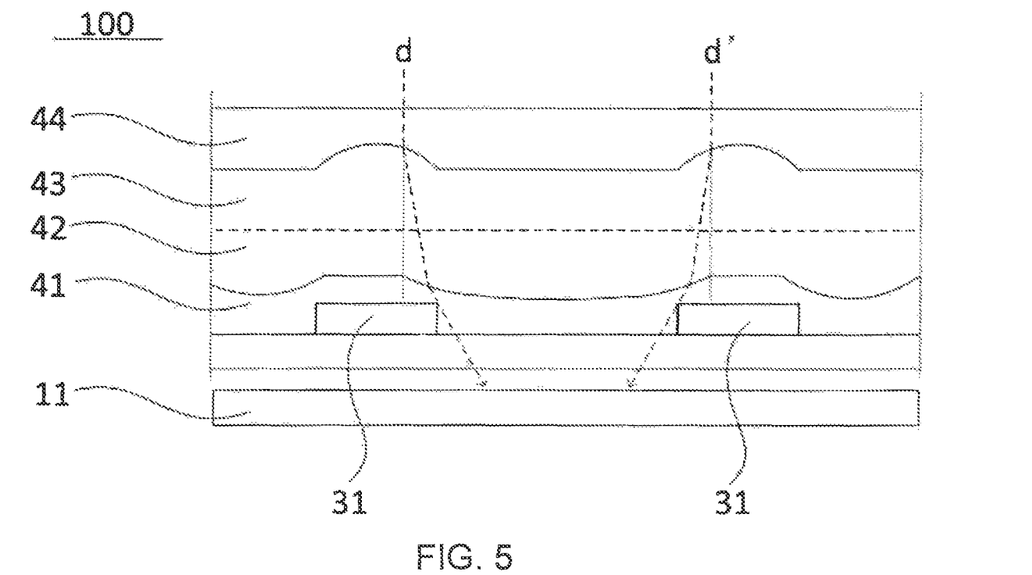
FIG. 5 is a schematic diagram of a third structure of a display panel according to an embodiment of the present application.

In one embodiment, as shown in FIG. 5, the encapsulation layer of the display panel 100 includes, in addition to the first organic layer 41 and the first inorganic layer 42, which are stacked as shown in FIG. 1, and further includes the second organic layer 43 and the second inorganic layer 44 that are stacked. The second organic layer 43 is disposed on the first inorganic layer 42.

In one embodiment, the second organic layer 43 is formed on the first inorganic layer 42 by any process such as inkjet printing, spray coating, or coating. Then, the second organic layer 43 subjected to the drying process is exposed through a mask. An exposure area is formed in the electronic component arrangement area. Then develop the exposure area to get a desired convex pattern. Then, the convex pattern is etched to form a required convex.

In one embodiment, a cross-sectional shape of the convex is a circular arc.

In one embodiment, the second inorganic layer 44 is deposited on the second organic layer 43 by a physical vapor deposition (PVD) or chemical vapor deposition (CVD) or atomic layer deposition (ALD) process. The second inorganic layer 44 is deposited on the second organic layer 43 and covers the convex. A cross section forming a contact surface between the second organic layer 43 and the second inorganic layer 44 is a third circular arc.

In an embodiment, as shown in FIG. 5, the third circular arc is located at an edge region of the lighting path of the electronic component, and a center of the third circular arc is located at one side of the second organic layer 43. A curvature radius of the third circular arc gradually increases from an edge to a middle.

In one embodiment, a refractive index of the first organic layer 41 is less than a refractive index of the first inorganic layer 42, and a refractive index of the second organic layer 43 is less than a refractive index of the second inorganic layer 44.

In one embodiment, when external light d, d" is incident on the display panel vertically, part of the light d, d' originally blocked by the sub-pixel light-emitting unit 31 is refracted by the first circular arc and the third circular arc twice. The light will pass through the gap of the sub-pixel light-emitting unit 31 and reach the lighting unit 11 of the electronic component.

In the display panel provided in this embodiment, the first circular arc and the third circular arc are provided on the encapsulation layer. In the light incident perpendicularly to the display panel, part of the light blocked by the sub-pixel light-emitting unit is refracted twice by the first circular arc and the third circular arc. The light will pass through the gap between the sub-pixel light-emitting units and reach the lighting unit of the electronic component, thereby improving the extraction efficiency of the external light by the lighting unit of the electronic component.

Figure 6:
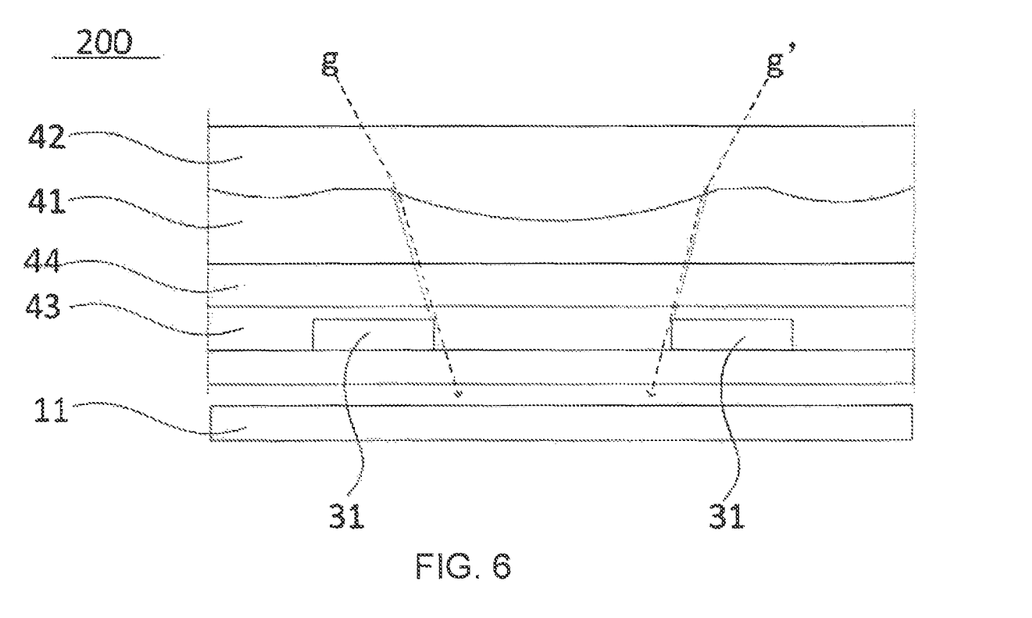
FIG. 6 is a schematic diagram of a fourth structure of a display panel according to an embodiment of the present application.

In one embodiment, as shown in FIG. 6, the encapsulation layer of the display panel 100 includes, in addition to the first organic layer 41 and the first inorganic layer 42, which are stacked as shown in FIG. 1, and further includes the second organic layer 43 and the second inorganic layer 44 that are stacked. The second organic layer 43 is disposed on the first inorganic layer 42.

In one embodiment, the second organic layer 43 is formed on the light emitting functional layer by any process of inkjet printing, spray coating, or coating, and then the second inorganic layer 44 is deposited on the second organic layer 43 by a physical vapor deposition (PVD) or chemical vapor deposition (CVD) or atomic layer deposition (ALD) process.

In one embodiment, the first organic layer 41 is also formed on the second inorganic layer 44 by using any process of inkjet printing, spraying, or coating. Then, exposure, development, and etching are performed to form the required first groove. Finally, the first inorganic layer 42 is deposited on the first organic layer 41. A cross section of a contact surface between the first organic layer 41 and the first inorganic layer 42 is a first circular arc.

In an embodiment, as shown in FIG. 6, in the electronic component arrangement area, when external light is directed to the display panel from different angles, light g, g' originally blocked by adjacent sub-pixel light-emitting units 31, after refraction of the first circular arc, can reach the lighting unit 11 of the electronic component through a gap between the adjacent sub-pixel light-emitting units 31.

This embodiment provides a display panel, and the encapsulation layer adopts a four-layer structure design. A first groove is provided on the first organic layer, and the first inorganic layer is provided on the first organic layer and filled in the first groove. A first circular arc is formed on a contact surface between the first organic layer and the first inorganic layer. After the external light is refracted by the first circular arc, part of the light originally blocked by the sub-pixel light-emitting unit can also pass through the gap between the adjacent sub-pixel light-emitting units and reach the lighting unit of the electronic component. Thereby, the extraction efficiency of the external light by the electronic component lighting unit is improved.

In an embodiment, an embodiment of the present application further provides a display device 200, and the display device includes any one of the display panels described in the foregoing embodiments.

In an embodiment, the display panel of this embodiment is described by taking the display panel shown in FIG. 1 as an example. In the electronic component arrangement area, the encapsulation layer of the display panel is formed with a first circular arc, and the first circular arc is located on the lighting path of the electronic component.

Figure 7:
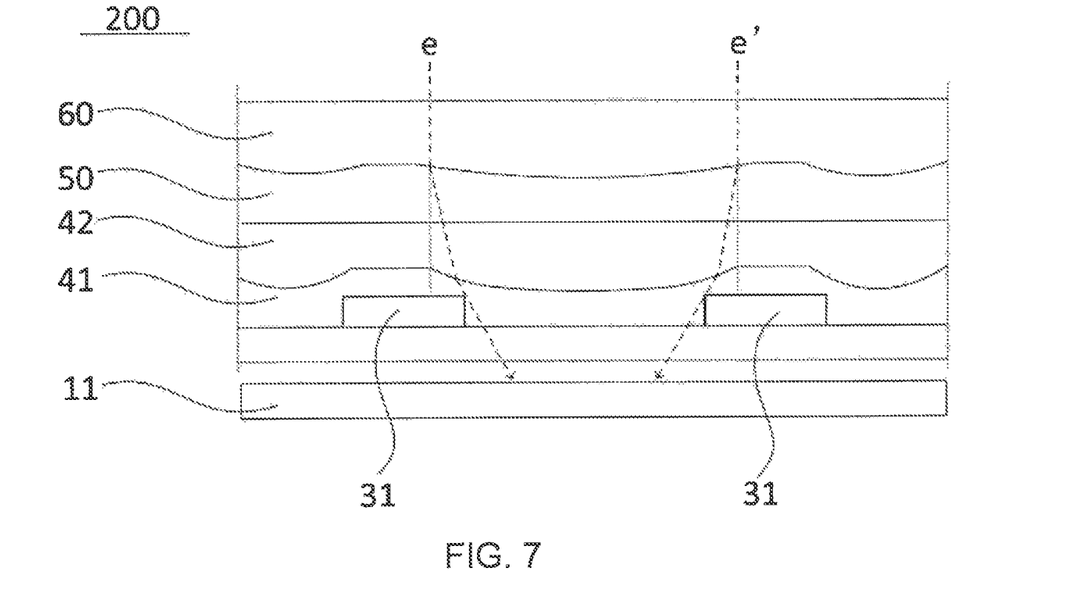
FIG. 7 is a schematic diagram of a first structure of a display device according to an embodiment of the present application.

In one embodiment, as shown in FIG. 7, the display device 200 further includes a polarizer 60 disposed on a pressure-sensitive adhesive 50 and the display panel. In the electronic component arrangement area, a fourth circular arc is formed in a cross section of a contact surface between the polarizer 60 and the pressure-sensitive adhesive 50.

In one embodiment, the polarizer is used for anti-glare function of the screen, which can enhance the contrast of OLED under strong light and reduce the interference caused by strong light.

In an embodiment, the fourth circular arc is located on the lighting path of the electronic component, and a center of the fourth circular arc is located on one side of the polarizer.

In one embodiment, an arc length of the fourth circular arc is greater than an arc length of the first circular arc.

In the display device 200 provided in this embodiment, the first circular arc is provided on the encapsulation layer. The fourth circular arc is disposed on the polarizer 60. In light incident perpendicularly to the display device, the light e, e' partially blocked by the sub-pixel light-emitting unit 31 is refracted twice by the fourth circular arc and the first circular arc. The light will pass through the gap of the sub-pixel light-emitting units 31 and reach the lighting unit 11 of the electronic component, thereby improving the extraction efficiency of the external light by the lighting unit of the electronic component.

Figure 8:
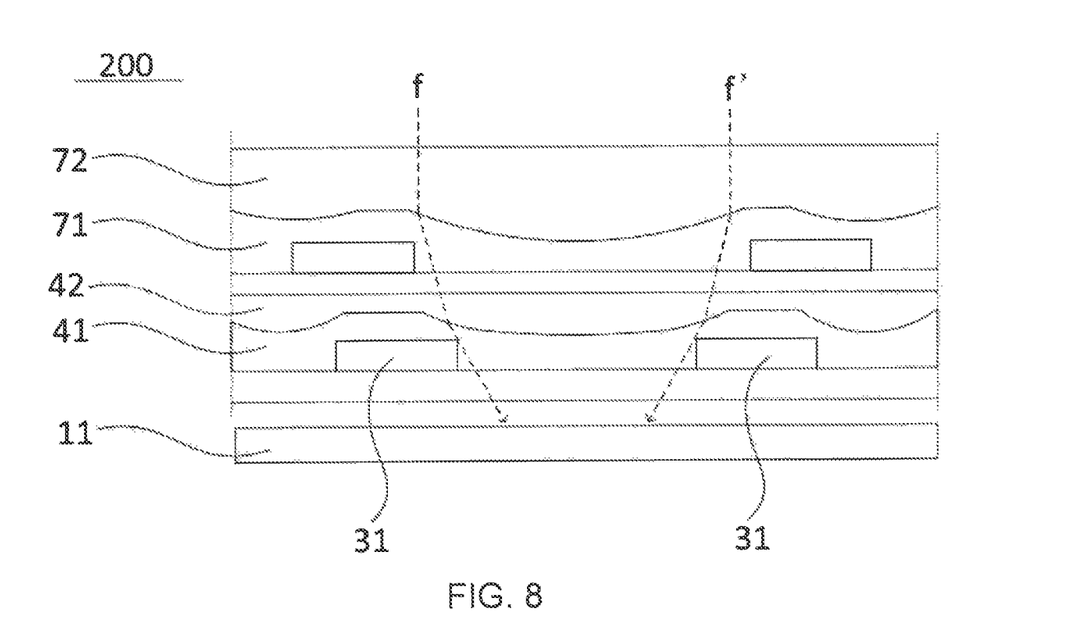
FIG. 8 is a schematic diagram of a second structure of a display device according to an embodiment of the present application.

In one embodiment, the display device further includes a touch panel disposed on the display panel. As shown in FIG. 8, the touch panel includes a touch electrode layer, a third organic layer 71, and a third inorganic layer 72 which are arranged in a stack.

In an embodiment, as shown in FIG. 8, the display panel of the display device uses the display panel shown in FIG. 1, and the cross section of the contact surface between the first organic layer 41 and the first inorganic layer 42 is a first circular arc, and details are not described herein again.

In one embodiment, as shown in FIG. 8, the third organic layer 71 is formed on the light emitting functional layer by any process such as inkjet printing, spray coating, or coating. Then, the third organic layer 71 subjected to the drying process is exposed through a mask. An exposure area is formed in the electronic component arrangement area. Then develop the exposure area to get a desired groove pattern. Then, the groove pattern is etched to form a required third groove.

In one embodiment, a cross-sectional shape of the third groove is a circular arc.

In one embodiment, the third inorganic layer 72 is deposited on the third organic layer 71 by a physical vapor deposition (PVD) or chemical vapor deposition (CVD) or atomic layer deposition (ALD) process. The third inorganic layer 72 is deposited on the third organic layer 71 and filled in the third groove. A cross section forming a contact surface between the third organic layer 71 and the third inorganic layer 72 is a fifth circular arc.

In an embodiment, as shown in FIG. 8, the fifth circular arc is located on a gap between two adjacent sub-pixel light-emitting units 31, that is, on a lighting path of the electronic component. A center of the fifth circular arc is located on one side of the third inorganic layer 72. A curvature radius of the fifth circular arc gradually increases from an edge to a middle.

In one embodiment, a refractive index of the third organic layer 71 is less than a refractive index of the third inorganic layer 72.

In an embodiment, as shown in FIG. 8, when external light strikes the display device vertically, light f, f' originally blocked by the adjacent sub-pixel light-emitting units 31, after refraction of the fifth circular arc and the first circular arc, can reach the lighting unit 11 of the electronic component through the gap between the adjacent sub-pixel light-emitting units.

This embodiment provides a display device including a touch panel. A third groove is provided on the third organic layer of the touch panel. The third inorganic layer is disposed on the third organic layer and is filled in the third groove. A fifth circular arc is formed on a contact surface between the third organic layer and the third inorganic layer. After the external light is refracted by the fifth circular arc and the first circular arc, a part of the light originally blocked by the sub-pixel light-emitting unit can also pass through the gap between the adjacent sub-pixel light-emitting units to reach the lighting unit of the electronic component. Therefore, the extraction efficiency of the external light by the electronic component lighting unit is improved.

It can be known from the foregoing embodiments that the embodiments of the present application provide a display panel and a display device. In the electronic component arrangement area, a circular arc is provided on the encapsulation layer, the touch panel, or the polarizer. Part of the light blocked by the sub-pixel light-emitting units is refracted by a circular arc, passes through the gap between the sub-pixel light-emitting units, and reaches the lighting unit of the electronic component. Therefore, the extraction efficiency of external light by the electronic component is improved.

In summary, although the present application has been disclosed above with preferred embodiments, the above preferred embodiments are not intended to limit the present application. Those of ordinary skill in the art can make various modifications and improvements without departing from the spirit and scope of the present application. Therefore, the protection scope of this application is subject to the scope defined by the claims.

What is claimed is:

1. A display panel, comprising:
   a driving circuit layer;
   sub-pixel light-emitting units disposed on the driving circuit layer;
   at least a first organic layer and a first inorganic layer that are stacked disposed on the sub-pixel light-emitting units, wherein a refractive index of the first organic layer is less than a refractive index of the first inorganic layer; and
   a second organic layer and a second inorganic layer that are stacked, wherein a refractive index of the second organic layer is less than a refractive index of the second inorganic layer;
   wherein in an electronic component arrangement area, a cross section of a contact surface between the first organic layer and the first inorganic layer is a first circular arc; the first circular arc is located on a lighting path of an electronic component, and a center of the first circular arc is located on one side of the first inorganic layer.

2. The display panel according to claim 1, wherein a curvature radius of the first circular arc gradually increases from an edge to a middle.

3. The display panel according to claim 1, wherein the second organic layer is disposed on the first inorganic layer.

4. The display panel according to claim 1, wherein the first organic layer is disposed on the second inorganic layer.

5. The display panel according to claim 3, wherein in the electronic component arrangement area, a cross section of a contact surface between the second organic layer and the second inorganic layer is a second circular arc; the second circular arc is located on the lighting path of the electronic component, and a center of the second circular arc is located on one side of the second inorganic layer.

6. The display panel according to claim 5, wherein a curvature radius of the second circular arc gradually increases from an edge to a middle.

7. The display panel according to claim 6, wherein an arc length of the second circular arc is greater than an arc length of the first circular arc.

8. The display panel according to claim 3, wherein a cross section of a contact surface between the second organic layer and the second inorganic layer is a third circular arc; the third circular arc is located at an edge region of the lighting path of the electronic component, and the center of the third circular arc is located at one side of the second organic layer.

9. The display panel according to claim 8, wherein a curvature radius of the third circular arc gradually increases from an edge to a middle.

10. The display panel according to claim 9, wherein an arc length of the third circular arc is greater than an arc length of the first circular arc.

11. A display device comprising the display panel according to claim 1.

12. The display device according to claim 11, further comprising a first pressure-sensitive adhesive disposed on the display panel and a polarizer disposed on the first pressure-sensitive adhesive.

13. The display device according to claim 12, wherein a cross section of a contact surface between the polarizer and the first pressure-sensitive adhesive is a fourth circular arc; the fourth circular arc is located on the lighting path of the electronic component, and a center of the fourth circular arc is located on the polarizer.

14. The display device according to claim 13, wherein a curvature radius of the fourth circular arc gradually increases from an edge to a middle.

15. The display device according to claim 14, wherein an arc length of the fourth circular arc is greater than an arc length of the first circular arc.

16. The display device according to claim 11, further comprising a at least a third organic layer and a third inorganic layer that are stacked disposed on the polarizer.

17. The display device according to claim 16, wherein a cross section of a contact surface between the third organic layer and the third inorganic layer is a fifth circular arc; the fifth circular arc is located on the lighting path of the electronic component, and a center of the fifth circular arc is located on one side of the third inorganic layer.

18. The display device according to claim 17, wherein a curvature radius of the fifth circular arc gradually increases from an edge to a middle.

19. The display device according to claim 18, wherein an arc length of the fifth circular arc is greater than an arc length of the first circular arc.

* * * * *